| United States Patent [19] | [11] Patent Number: 4,957,981 |
| Schutyser et al. | [45] Date of Patent: Sep. 18, 1990 |

[54] INTERPENETRATING POLYMER NETWORK OF AN ALIPHATIC POLYOL(ALLYL CARBONATE) AND EPOXY RESIN

[75] Inventors: Jan André J. Schutyser, Dieren; Tjerk O. Boonstra, Arnhem, both of Netherlands

[73] Assignee: Akzo N.V., Netherlands

[21] Appl. No.: 473,488

[22] Filed: Feb. 1, 1990

[30] Foreign Application Priority Data

Feb. 10, 1989 [NL] Netherlands ............... 8900323

[51] Int. Cl.[5] .............................................. C08L 47/00
[52] U.S. Cl. ...................................... 525/529; 525/903
[58] Field of Search ............................... 525/529, 903

[56] References Cited

U.S. PATENT DOCUMENTS

| 4,135,792 | 1/1979 | Deeg et al. | 351/41 |
| 4,138,538 | 2/1979 | Kaetsu et al. | 526/73 |
| 4,360,653 | 11/1982 | Stevens et al. | 525/404 |
| 4,698,374 | 10/1987 | Gallas | 523/106 |

FOREIGN PATENT DOCUMENTS

| 2322884 | 4/1977 | France . |
| 537788 | 1/1978 | Japan . |
| 58120618 | 7/1983 | Japan . |
| 1542119 | 3/1979 | United Kingdom . |

OTHER PUBLICATIONS

C. E. Schildknecht, *High Polymers*, vol. 18, pp. 306–325, New York: Interscience Publishers, (1973).

J. R. Millar, *Journal of Chemical Society*, "Interpenetrating Polymer Networks, Styrene-Divinylbenzene copolymers With Two and Three Interpenetrating Networks and Their Sulphonates", p. 1311, (1960).

*Primary Examiner*—Lewis T. Jacobs
*Assistant Examiner*—Robert E. L. Sellers, II
*Attorney, Agent, or Firm*—David H. Vickrey; Louis A. Morris

[57] ABSTRACT

Polymeric material comprising an interpenetrating network of a polyol(allyl carbonate), e.g., Nouryset ®200, epoxy resin. The polymeric material is prepared by polymerizing 70 to 95 parts by weight of the polyol(allyl carbonate) by radical initiation and polymerizing partially or entirely simulataneously an epoxy resin-forming mixture by acid catalysis. The epoxy resin-forming mixture comprises 10–90 wt. % of aliphatic or cycloaliphatic polyepoxide and 90–10 wt. % of a polyol/anhydride adduct having molecular weight of 500–5,000.

2 Claims, No Drawings

INTERPENETRATING POLYMER NETWORK OF AN ALIPHATIC POLYOL(ALLYL CARBONATE) AND EPOXY RESIN

BACKGROUND OF THE INVENTION

The invention relates to a polymeric material based on an aliphatic polyol(allyl carbonate). Polymerizates of aliphatic polyol(allyl carbonates) are generally known, e.g., from C. E. Schildknecht, *High Pol.*, Vol. 18, pp. 306–325 (1973). They find frequent use in optical applications, more particularly lenses, on account of such favourable properties as a relatively high index of refraction, high clarity, satisfactory dye receptivity, and reasonable hardness. However, it is desired that the impart strength of polymers be increased.

It should be noted that the improvement of the impact strength of polymeric materials based on aliphatic polyol(allyl carbonate) was proposed before: in U.S. Pat. No. 4,360,653 aliphatic polyol(allyl carbonate) is copolymerized with urethane acrylates. However, no properties other than impact strength are given for these copolymers. On the basis of p. 316 of the publication by Schildknecht referred to hereinbefore the use of urethane acrylates can be expected to lead to a significant degree of yellowing. Moreover, polyurethane acrylates have the drawback of a complex synthesis—this is in contradistinction to the compounds suitable for use in the invention—and are susceptible to water.

The invention has for its object to increase the impact strength relative to the homopolymerizate of the aliphatic polyol(allyl carbonate) by at least 50% without other properties being detrimentally affected. This object is accomplished by forming a specific interpenetrating network of an aliphatic polyol(allyl carbonate) and an aliphatic or cycloaliphatic epoxy resin.

By the well-known term "interpenetrating polymer network", hereinafter to be abbreviated to IPN, is meant a material containing two networks, at least one of which is formed in the presence of the other. Thus, in *J. Chem. Soc.*, p. 1311 (1960) Miller has described an IPN of styrene and divinyl benzene prepared by a known divinyl benzene-styrene resin being permeated with a divinyl benzene-styrene monomer solution and these monomers subsequently being polymerized. When use is made of monomer mixtures each polymerized differently, an IPN can alternatively be produced by simultaneous polymerization. In the IPN's according to the invention the polyol (allyl carbonate) is polymerized by a radical chain reaction, and the epoxy resin is formed by step polymerization.

In rare cases there may be molecular mixing in an IPN. The final polymeric material will then have one glass transition temperature. Generally, the polymers form separate and dissimilar phases, so that the material will show two glass transitions. This phase separation is the main reason why aromatic epoxy resins should not form part of the IPN's according to the invention. Due to a difference in index of refraction aromatic epoxy resin parts will cause turbidity in a polyol(allyl carbonate). This problem can be overcome by selecting aliphatic or cycloaliphatic epoxy resins.

IPN's according to the invention should not be confused with copolymers of polyol(allyl carbonate) and epoxy group-containing olefin monomers, e.g., glycidyl acrylate. Such copolymers are known from U.S. Pat. No. 4,138,538, which discloses an improved polymerization method in which both the polyol (allyl carbonate) and the epoxy group-containing monomers are polymerized under the influence of irradiation.

The polymeric materials according to the invention can be utilized for the manufacture of a wide range of optical products, such as corrective plano lenses for spectacles, more particularly for protective goggles, lenses in optical instruments, guards, transparent covers for watches, measuring instruments, and the like. Because of their satisfactory dye receptivity the materials also are very suited to be used in the manufacture of tinted optical products, such as sunglasses.

SUMMARY OF THE INVENTION

The invention is a polymeric material based on an aliphatic polyol(allyl carbonate), the polymeric material comprised of an interpenetrating polymer network of a polymerizate of the aliphatic polyol(allyl carbonate) and an aliphatic or cycloaliphatic epoxy resin.

Further, the invention is a process for the preparation of a polymeric material having an interpenetrating polymer network comprised of an aliphatic polyol(allyl carbonate), the process comprising polymerizing 70–95 parts by weight of polyol(allyl carbonate) using a radical initiator and polymerizing, using an acid catalyst, 30–5 parts by weight of an epoxy resin-forming mixture comprised of 10–90% by weight of an aliphatic or cycloaliphatic polyepoxide and 90–10% by weight of a polyol/anhydride adduct with a molecular weight of 500–5,000, wherein said two polymerizations are carried out at least partially simultaneously.

The invention is also an optical lens comprised of a polymeric material, said polymeric material comprised of an interpenetrating polymer network of a polymerizate of an aliphatic polyol(allyl carbonate) and an aliphatic or cycloaliphatic epoxy resin.

DETAILED DESCRIPTION OF THE INVENTION

The polyol(allyl carbonates) that may be contained in the polymeric material according to the invention are mentioned in U.S. Pat. No. 4,360,653. The preferred polyol(allyl carbonate) because of its optimal combination of favourable properties is diethylene glycol bis(allyl carbonate) known under the registered trademarks Nouryset ®200 and CR-39 ® marketed by Akzo and PPG, respectively. This material is also described in the above-mentioned publication by Schildknecht (pp. 301–315).

The epoxy resin employed is as a rule built up from an aliphatic or a cycloaliphatic polyepoxide and a polyol/dicarboxylic anhydride adduct having a number average molecular weight of 500–5,000. Polyols can be described as hydroxyl-containing monomolecular compounds having a number average molecular weight of 500–5,000. Particularly suitable for use according to the invention are macrodiols, polymers with two preferably terminal hydroxyl groups and a glass transition temperature (Tg) below room temperature. As examples of these flexible macrodiols may be mentioned: polyethers, polyesters such as polyhexane/neopentyl glycol adipate, polylactones such as poly-ε-caprolactone, and polycarbonates such as polyhexane diol carbonate.

Most suited to be used are polyethers such as polyethylene glycol, polypropylene glycol and block copolymers of ethylene oxide and propylene oxide; according to the invention polyethylene glycol is the most attractive one of this class of polyethers. This number average molecular weight of the macrodiols may be determined by, e.g., titrimetric determination of the hydroxyl groups content. Further suitable polyols according to the invention are trifunctional polymers (macrotriols) prepared by etherification of trimethylol propane or glycerol with propylene oxide and/or ethylene oxide.

Suitable as dicarboxylic anhydride are notably aliphatic dicarboxylic anhydrides such as hexahydrophthalic anhydride, methyl hexahydrophthalic anhydride, and succinic anhydride.

According to the invention, an adduct was prepared by reacting 1 mole of polyol with 1.5 to 3 moles of anhydride. After the whole was reacted over a period of 2-6 hours at a temperature of 60°-120° C., an adduct suitable for use in the present invention was obtained. As is known to the skilled artisan, such an adduct may also be prepared in a different manner, say by reaction of a polyol with aliphatic diacids in the presence of a highly acid catalyst, with water being driven off. The adduct can be prepared either in advance or in situ. By the latter is meant that the anhydride and the polyol are each added separately to the reaction mixture, so that the adduct is produced during the IPN's being formed.

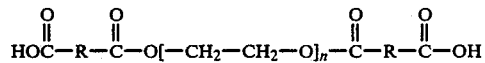

wherein n=10-200 and R is an alkylene group having 1-5 carbon atoms.

It is preferred that the properties of the polyol(allyl carbonate) be retained as much as possible by employing 70-95% by weight of it and 30-5% by weight of the epoxy resin-forming mixture.

Thus, the invention also relates to a process for the preparation of a polymeric material as described hereinbefore, in which process 70-95 parts by weight of polyol(allyl carbonate) are polymerized using a radical initiator and 30-5 parts by weight of an epoxy resin-forming mixture consisting of 10-90% by weight of an aliphatic or cycloaliphatic polyepoxide and 90-10% by weight of a polyol/anhydride adduct having a molecular weight of 500-5,000 are polymerized using an acid catalyst, with the two polymerizations being carried out wholly or partially simultaneously.

Polymeric materials with optimal properties are obtained when, in addition to selecting diethylene glycol bis(allyl carbonate) as already indicated, an epoxy resin-forming mixture is polymerized consisting of 40-60% by weight of an adduct composed of 1 mole of polyethylene glycol and 1.5-3 moles of hexahydrophthalic anhydride and 60-40% by weight of a di-epoxy compound of the formula:

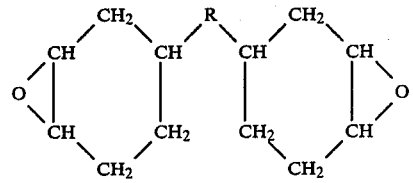

wherein R represents an aliphatic group having 2-10 carbon atoms, in which group there is present at least one ester group. Especially suitable is 3,4-epoxycyclohexyl methylene-3,4-epoxycyclohexane carboxylate:

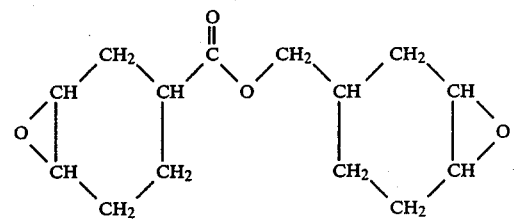

or bis(3,4-epoxycyclohexyl methylene) adipate:

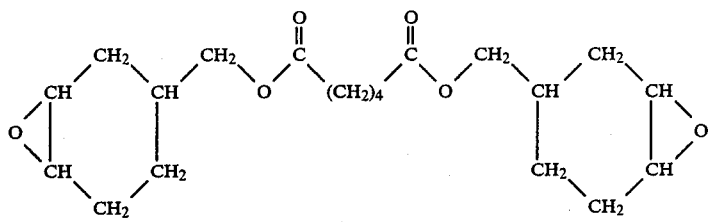

It has been found that the optimal results are obtained in the polymerization of the epoxy resin-forming mixture when the acid catalyst is a Lewis acid derived from tin, such as tin dichloride and tin dioctanoate. This is made manifest notably in the clarity and the colour of the final product. An appropriate amount of catalyst relative to the cycloaliphatic epoxy resin is 0.1-5%. Optimal properties are obtained when use is made of 1.5-3% of catalyst.

The polymerization of the polyol(allyl carbonate) in the interpenetrating polymer network is initiated by free radicals formed by thermic decomposition of initiators such as the organic peroxide compounds. Examples of such compounds include: benzoyl peroxide, p-chlorobenzoyl peroxide, 2,4-dichlorobenzoyl peroxide, decanoyl peroxide, lauroyl peroxide, and acetyl peroxide, percarbonates such as diisopropyl peroxydicarbonate, di-sec. butyl peroxydicarbonate, and di-2-ethylhexyl peroxydicarbonate, alkyl peresters such as t-butyl-peroxy-2-ethyl hexanoate and t-butyl peroxypivalate, perketals such as 1,1-di(t-butylperoxy)-3,3,5-trimethyl cyclohexane, and azo compounds such as azobisisobutyronitrile. The amount of initiator is dependent on the type of polymerization, the polymerization conditions, the monomers used, etc. Generally, an amount of 0.05-10% by weight, preferably of 0.1-8% by weight of the total weight of polyol(allyl carbonate) will suffice. The polymerization reaction is preferably carried out in a mould. The quality of the optical products according to the invention is influenced to a large extent by the polymerization temperature, which is dependent on the types of monomers and on their relative weight ratios as well as on the type of initiator and catalyst. In general, it is preferred that the polymerization reaction be initiated at a relatively low temperature, the temperature be increased gradually, and the product cured at elevated temperature toward the end of the polymerization reaction. Preferred conditions generally allow the polymerization to be completed within 2–40 hours. Optionally, the polymerization reaction may be carried out in the presence of mould releasing agents, UV-stabilizers, antioxidants, dyes, and a phlegmatizer for the initiator.

The invention will be illustrated hereinafter with reference to the following examples.

The properties of the materials indicated in the examples were determined as follows:
the index of refraction ($N^2_D$) and the Abbe value with the use of an Abbe refractometer;
the shore D hardness in accordance with DIN 53505;
the specific gravity $D_4^{2°}$ with the use of a pyknometer;
the Yellowness Index in accordance with ASTM D 1925-70 (reapproved 1977) and ASTM E 308-66 (reapproved 1985);
the mean impact strength (plus standard deviation $\delta$) by unnotched Charpy test in accordance with ISO, 179-182;
the scratch resistance measured as transmission loss in % after Taber abrasion in accordance with ASTM 1044-82;
the solvent resistance: the samples were immersed for 5 minutes at room temperature in each of the following 4 liquids: ethanol, acetone, 5% aqueous sodium hydroxide solution, and 5% aqueous hydrogen chloride solution. The samples which did not suffer any visible damage in the experiment were found to be solvent resistant.

EXAMPLE 1

4 mm thick test sheets based on an interpenetrating network of which the composition is given in Table 1 were prepared as follows:

To 82.7 g of Nouryset ® 200 diethylene glycol bis(allyl carbonate) were added 0.206 g of tin dichloride-2.aqua($SnCl_2.2H_2O$), which is 2.75 by weight of the amount of cycloaliphatic epoxide. Following about 1 hour's stirring at room temperature, the epoxy catalyst was dissolved and there were added successively, with stirring, 7.5 g of adduct prepared by reacting 100 g (0.05 moles) of polyethylene glycol having a number average molecular of 2,000 (PEG$^{2000}$ for short) for 2 hours at 80° C. with 15.4 g (0.1 mole) of hexahydrophthalic anhydride (HHPA), 2.30 g of anhydrous benzoyl peroxide (BPO, with 2.70% by weight of the total of Nouryset ® 200 plus initiator), and finally, 7.5 g of bis(3,4-epoxylcyclohexyl methylene)adipate (BECA for short). After the air was removed with a vacuum pump and after filtration the thin viscous, colourless mixture was passed to a mould made of a 4 mm thick sealing ring of softened PVC in between two glass sheets of 15×15 cm. The sheets were held together by six clamps. The filled moulds were then placed in a forced-circulation air oven and polymerization was carried out over a residence period of successively:
7 hours at 65° C.,
5 hours at 78° C., and
9 hours at 90° C.

Following their release from the mould, the sheets were subsequently hung in a forced-circulation air oven for 2 hours at 90° C. to remove all residual tension. The properties of the resulting test sheets are listed in Table 1.

EXAMPLE 2

In the same manner as described in Example 1, 4 mm thick test sheets were prepared of the composition:
79.90 g of Nouryset ® 200;
0.206 g of tin dichloride-2.aqua;
7.5 g of adduct prepared by reacting 100 g (0.05 moles) of PEG$^{2000}$ for 2 hours at 80° C. with 23.10 g (0.15 moles) of hexahydrophthalic anhydride;
5.10 g of a 50 (wt.) % benzoyl peroxide solution in dicyclohexyl phthalate;
7.50 g of bis(3,4-epoxycyclohexyl methylene)adipate.

The composition and properties of the whole are given in Table 1.

EXAMPLE 3

Analogous to Example 1, 4 mm thick test sheets were prepared from:
75.2 g of Nouryset ® 200;
0.275 g of tin dichloride-2.aqua;
10 g of adduct prepared by reacting 100 g (0.05 moles) of propylene oxide/ethylene oxide block copolymer having a number average molecular weight of 2,000, (PP/EG$^{2000}$ for short) for 2 hours at 80° C. with 15.4 g (0.1 mole) of hexahydrophthalic anhydride. The block copolymer has a central portion of polypropylene glycol with a number average molecular weight of 1.750;
4.80 g of 50 (wt.) % benzoyl peroxide solution in dicyclohexyl phthalate;
10 g of bis(3,4-epoxycyclohexyl methylene)adipate (BECA).

The composition and properties of the whole area given in Table 1.

EXAMPLE 4

Analogous to Example 1, 4 mm thick test sheets were prepared of the same composition as described in Example 3, except that instead of bis(3,4-epoxycyclohexyl methylene) adipate (BECA) 3,4-epoxycyclohexyl methylene-3,4-epoxycyclohexane carboxylate (EECC) was used.

The composition and properties are given in Table 1.

EXAMPLE 5

Analogous to Example 1, 4 mm thick test sheets were prepared from:
79.90 g of Nouryset ® 200;
0.206 g of tin dichloride-2.aqua;
7.5 g of adduct prepared as described in Example 3;
5.10 g of 50 (wt.) % benzoyl peroxide solution in dicyclohexyl phthalate;
6 g of bis(3,4-epoxycyclohexyl methylene)adipate (BECA);
1.5 g of 3,4-epoxycyclohexyl methylene-3,4-epoxycyclohexane carboxylate (EECC).

The compositions and properties are listed in Table 1.

EXAMPLE 6

Analogous to Example 1, 4 mm thick test sheets were prepared from:
78.84 g of Nouryset ® 200;
0.200 g of tin dichloride-2.aqua;

10 g of Tegomer C-3101, a commercially available adduct (manufactured by Th. Goldschmidt AG) of the following general structure:

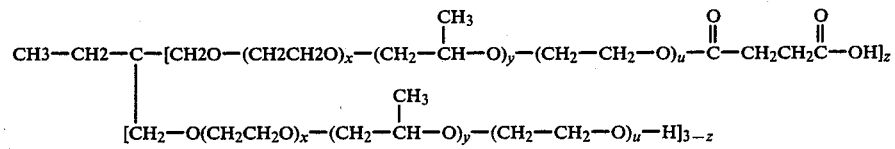

having a carboxyl equivalent weight of 1,440 g and an average molar ratio of propylene oxide to ethylene oxide of 14:2;
2.16 g of anhydrous benzoyl peroxide;
10 g of bis(3,4-epoxycyclohexyl methylene)adipate (BECA).

The composition and properties are listed in Table 1.
Control material: Nouryset ® 200.

4 mm thick sheets of Nouryset ® 200 were made in the same type mould and by the same polymerization cycle as described in Example 1, making use of 97.3 g of Nouryset ® 200 monomer and 2.7 g of anhydrous benzoyl peroxide.

The composition and properties are given in Table 1.

5.13 g (=5.1 mmoles) of a commercially available polyether triol, Voranol CP 1055 (ex Dow Chemical) with an average molecular weight of 1,000;
2.37 g (=15.3 mmoles) of hexahydrophthalic anhydride;
5.10 g of a 50 (wt) % benzoyl peroxide solution in dicyclohexyl phthalate;
7.50 g of bis(3,4-epoxycyclohexyl methylene)adipate. Here the adduct is not prepared in advance but in situ.

The properties of the composition containing 85% by weight of Nouryset ® 200 plus initiator solution are: Shore D hardness 79, Yellowness Index 1.8; Charpy impact strength unnotched 20± 4 kJ/m$^2$; solvent resistant, and index of refraction 1.5 with an Abbe value of 54.

We claim:

1. A polymeric material based on an aliphatic polyol(allyl carbonate), the polymeric material comprised of an interpenetrating polymer network of a polymerizate of the aliphatic polyol(allyl carbonate) and an aliphatic or cycloaliphatic epoxy resin.

2. A polymeric material of claim 1 wherein the aliphatic polyol(allyl carbonate) is diethylene glycol bis(allyl carbonate).

TABLE 1

|  | Control Nouryset ® 200 | Example 1 | Example 2 | Example 3 | Example 4 | Example 5 | Example 6 |
|---|---|---|---|---|---|---|---|
| pts. of Nourset ®$^{200}$ + initiator | 100 | 85 | 85 | 80 | 80 | 85 | 80 |
| % initiator | 2.7 BPO | 2.7 BPO | 6 BPOsol. | 6 BPOsol. | 6 BPOsol. | 6 BPOsol. | 2.7 BPO |
| pts. of adduct | — | 7.5 HHPA PEG$^{2000}$ | 7.5 HHPA PEG$^{2000}$ | 10 HHPA PP/EG$^{2000}$ | 10 HHPA PP/EG$^{2000}$ | 7.5 HHPA PP/EG$^{2000}$ | 10 Tegomer |
| pts. of BECA | — | 7.5 | 7.5 | 10 | — | 6.0 | — |
| pts. of EECC | — | — | — | — | 10 | 1.5 | 10 |
| % SnCl2-2.aqua | — | 2.75 | 2.75 | 2.75 | 2.75 | 2.75 | 2.00 |
| Yellowness Index | 1.3 | 1.2 | 1.5 | 2.5 | 1.6 | 1.7 | 1.3 |
| N$_D^{20}$ (Abbe value) | 1.50 (58) | 1.50 (53) | 1.50 (53) | 1.50 (54) | 1.50 (52) | 1.50 (53) | 1.50 (54) |
| Shore D hardness | 85 | 78 | 80 | 73 | 75 | 78 | 76 |
| Spec. gravity D$_4^{20}$ (cc/g) | 1.310 | 1.280 | 1.280 | 1.260 | 1.280 | 1.273 | 1.275 |
| Impact strength Charpy unnotched kJ/m$^2$ | 13 | 32 | 29 | 28 | 30 | 29 | 28 |
| Standard deviation $\sigma$ | (4) | (5) | (5) | (4) | (5) | (4) | (5) |
| Taber, transmission loss in % | 1.5 | 3.5 | 3.8 | 8 | — | 5.6 | — |
| Solvent resistant? | yes | yes | yes | yes | yes | yes | yes |

EXAMPLE 7

In the same manner as described in Example 1, 4 mm thick test sheets of the following composition were prepared:
79.90 g of Nouryset ® 200;
0.206 g of tin dichloride-2.aqua